United States Patent
Graepel et al.

(10) Patent No.: US 8,672,764 B2
(45) Date of Patent: Mar. 18, 2014

(54) ADAPTIVE MATCHMAKING FOR GAMES

(75) Inventors: Thore Graepel, Cambridge (GB); Ralf Herbrich, Cambridge (GB); David Shaw, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1223 days.

(21) Appl. No.: 11/693,635

(22) Filed: Mar. 29, 2007

(65) Prior Publication Data

US 2008/0242420 A1 Oct. 2, 2008

(51) Int. Cl.
A63F 9/24 (2006.01)

(52) U.S. Cl.
USPC .............................. 463/42; 463/29

(58) Field of Classification Search
USPC ................ 463/42, 29; 379/265, 266
See application file for complete search history.

(56) References Cited

U.S. PATENT DOCUMENTS

| | | | | |
|---|---|---|---|---|
| 5,206,903 | A * | 4/1993 | Kohler et al. | 379/265.12 |
| 5,956,485 | A | 9/1999 | Perlman | |
| 6,641,481 | B1 * | 11/2003 | Mai et al. | 463/42 |
| 6,651,086 | B1 * | 11/2003 | Manber et al. | 709/205 |
| 6,728,363 | B2 * | 4/2004 | Lieberman et al. | 379/266.06 |
| 6,751,597 | B1 | 6/2004 | Brodsky et al. | |
| 7,050,868 | B1 | 5/2006 | Graepel et al. | |
| 7,470,197 | B2 * | 12/2008 | Massey et al. | 463/42 |
| 2001/0034766 | A1 * | 10/2001 | Morimoto | 709/205 |
| 2001/0044339 | A1 | 11/2001 | Cordero et al. | |
| 2003/0129576 | A1 | 7/2003 | Wood et al. | |
| 2003/0171148 | A1 | 9/2003 | Weitz | |
| 2003/0177187 | A1 | 9/2003 | Levine et al. | |
| 2004/0002384 | A1 * | 1/2004 | Multerer et al. | 463/42 |
| 2004/0127289 | A1 * | 7/2004 | Davis et al. | 463/42 |
| 2005/0070359 | A1 * | 3/2005 | Rodriquez et al. | 463/42 |
| 2005/0192097 | A1 | 9/2005 | Farnham et al. | |
| 2005/0245303 | A1 | 11/2005 | Graepel et al. | |

(Continued)

FOREIGN PATENT DOCUMENTS

| KR | 20050090903 | 9/2005 |
|---|---|---|
| KR | 0542084 | 1/2006 |

OTHER PUBLICATIONS

"Matchmaking Powered by Gamespy", retrieved on the Internet on Jan. 8, 2007 at <<http://www.gamespy.net/matchmaking.php>>, 2 pages.

(Continued)

*Primary Examiner* — Steve Rowland
(74) *Attorney, Agent, or Firm* — Pablo Tapia; Jim Ross; Micky Minhas

(57) ABSTRACT

Matchmaking processes at online game services often result in players having to wait unacceptably long times to receive a match or immediately receiving a poorly matched session. By using a matchmaking process which dynamically adapts a good balance is achieved between the quality of proposed matches (for example, in terms of how balanced, interesting and fun those matches are likely to be) and the waiting time for potential matches. A matchmaking threshold is specified. When a player seeks a match a waiting time is observed, for example, as to how long that player waits until starting a game or dropping out. Information about such waiting times is used to dynamically update the matchmaking threshold. The update is made on the basis of a relationship between information about the observed waiting time and a target waiting time. Further control may be achieved by using separate matchmaking thresholds and target waiting times for different game categories.

18 Claims, 6 Drawing Sheets

(56) References Cited

U.S. PATENT DOCUMENTS

| | | | |
|---|---|---|---|
| 2006/0003825 A1 | 1/2006 | Iwasaki et al. | |
| 2006/0121990 A1* | 6/2006 | O'Kelley et al. | 463/42 |
| 2006/0135264 A1 | 6/2006 | Shaw et al. | |
| 2006/0247055 A1* | 11/2006 | O'Kelley et al. | 463/42 |
| 2006/0287096 A1* | 12/2006 | O'Kelley et al. | 463/42 |
| 2006/0287106 A1* | 12/2006 | Jensen | 463/42 |
| 2007/0127690 A1* | 6/2007 | Patakula et al. | 379/265.05 |
| 2007/0202953 A1* | 8/2007 | Taninami | 463/42 |
| 2008/0032759 A1* | 2/2008 | Takahashi | 463/1 |
| 2008/0045335 A1* | 2/2008 | Garbow et al. | 463/29 |

OTHER PUBLICATIONS

PCT International Search Report dated Aug. 14, 2008 from corresponding PCT Application No. PCT/US2008/058804, 4 pages.

* cited by examiner

ADAPTIVE MATCHMAKING FOR GAMES

BACKGROUND

Online gaming whereby players are able to access a game service via the Internet or other communications network is becoming increasingly popular. For example, this may enable players at different geographical locations to play each other at video games, online board games, online card games and the like. An important task for the online game service is to identify potential matches between players. For example, if player A wishes to play a game the game service is required to suggest one or more potential opponents.

Previously this has been addressed by simply identifying the first available potential player(s) for the match. This identifies matches quickly so that players do not have to wait long periods of time to play a game. However, the resulting match may be unsuitable, for example, if one player is an expert and the other a novice.

More recently, matchmaking processes at online game services have been designed to take into account other factors. For example, the skill of the players, the geographical locations of the players and the quality of communications connection being used by the various players. In this way the quality of the matches in terms of how challenging, interesting and fun those matches are may be improved. However, the time that a player needs to wait until a suitable match is found may often be unacceptably long when this type of approach is used. This is particularly the case where the pool of available players is reduced, perhaps because of the time of day, the particular game and game mode required, or the skill level of the player requiring a match.

Similar problems may also arise for games played without using online services but where it is required to identify matches for players.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Matchmaking processes at online game services often result in players having to wait unacceptably long times to receive a match or immediately receiving a poorly matched session. By using a matchmaking process which dynamically adapts a good balance is achieved between the quality of proposed matches (for example, in terms of how balanced, interesting and fun those matches are likely to be) and the waiting time for potential matches. A matchmaking threshold is specified. When a player seeks a match a waiting time is observed, for example, as to how long that player waits until starting a game or dropping out. Information about such waiting times is used to dynamically update the matchmaking threshold. The update is made on the basis of a relationship between information about the observed waiting time and a target waiting time. Further control may be achieved by using separate matchmaking thresholds and target waiting times for different game categories.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an online game system, the system described is provided as an example and not a limitation. As those skilled in the art will appreciate, the present examples are suitable for application in a variety of different types of game player matching systems.

As mentioned above matchmaking processes at online game services often result in players having to wait unacceptably long times to receive a match. This is particularly the case where the pool of available players is reduced, perhaps because of the time of day, the particular game and game mode required, or the skill level of the player requiring a match. For example, typically most players are of average skill level with only a relatively few players being of expert or novice skill level. Also, at particular times of day such as during the night, only a few players are available for potential matches. If it is required to match players who speak the same language for example, or who wish to play a less popular game or game mode, waiting times may also be increased.

By using a matchmaking process which dynamically adapts it is possible to achieve a good balance between the quality of proposed matches (for example, in terms of how balanced, interesting and fun those matches are likely to be) and the waiting time for potential matches.

An Exemplary System

Figure 1:
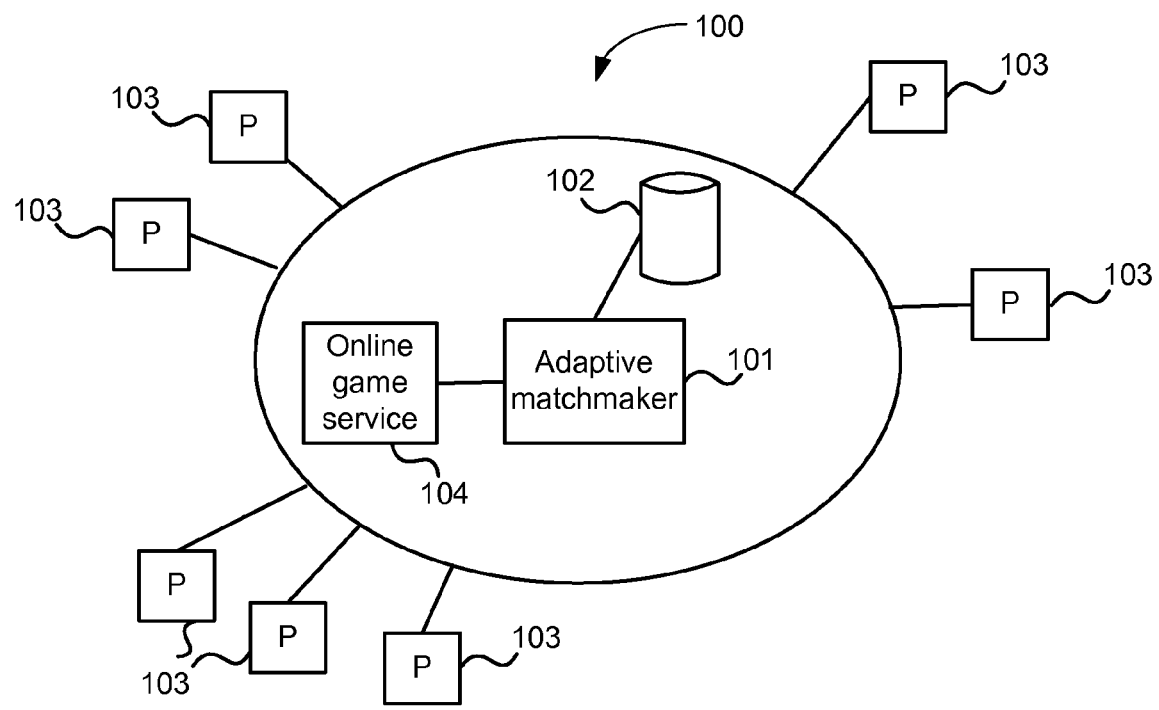
FIG. 1 is a schematic diagram of an online game service together with an adaptive matchmaker provided in a communications network.

FIG. 1 is a schematic diagram of an online game service 104 together with an adaptive matchmaker 101 provided in a communications network 100. The communications network 100 is of any suitable type such as the Internet, an Intranet, a domestic communications network, or any other communications network. It comprises an online game service 104 and an adaptive matchmaker 101 which may be integral or separate and which are provided using nodes in the communications network 100 such as web servers, or other suitable nodes. A database 102 or other data storage apparatus is provided in the communications network 100 and accessible to the adaptive matchmaker 101. Player terminals 103 are connected to the communications network 100 and arranged to access the online game service 104 in order to enable human or computer players to play online games with one another.

Exemplary Method

Figure 2:
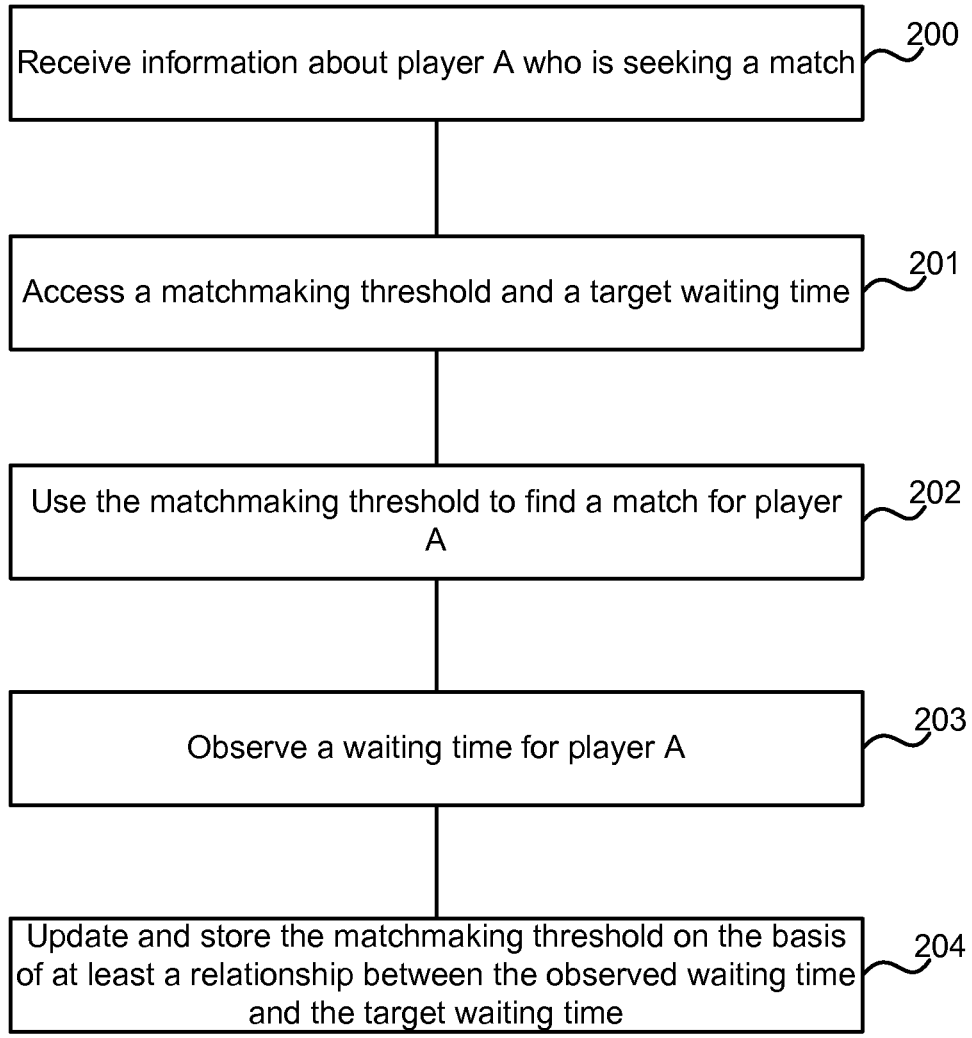
FIG. 2 is a flow diagram of an example method at the adaptive matchmaker of FIG. 1.

FIG. 2 is a flow diagram of an example method at the adaptive matchmaker 101 of FIG. 1. Information is received about player A who is seeking a match (block 200). For example, this information is received from a player terminal 103 and comprises information about the identity of player A and optionally information about the player terminal 103 such as the quality of its connection to the communications network 100, and the games functionality available at that player terminal.

The adaptive matchmaker 101 accesses a matchmaking threshold and a target waiting time (block 201) for example, from the database 102. More information about these values and how they are accessed is given later. The adaptive matchmaker uses the matchmaking threshold to identify one or more potential matches (block 202) as described below. It also observes a waiting time for player A (block 203). For example, the waiting time is the time from when the information is received about player A who is seeking a match to the time when player A is observed to have accepted a proposed match or to have dropped out of availability. Similar time periods may also be used for the waiting time as long as the same time period is used throughout the adaptive matchmaking process. For example, the waiting time may be the time from when the information is received about player A who is seeking a match to the time when player A actually enters a game or drops out.

The adaptive matchmaker 101 proceeds to update the matchmaking threshold on the basis of at least a relationship between information about the observed waiting time and information about the target waiting time (block 204). In this way the matchmaking threshold is dynamically adjusted and an optimal trade off between quality of proposed matches and waiting time may be achieved. The adaptive matchmaker can be thought of as "sensing" how long players have been waiting before they started playing or dropped out and using this sensed information to dynamically adjust.

Any suitable relationship between information about observed waiting time and information about target waiting time may be used. For example, this may be linear (a linear update rule is described below) or may be non-linear.

The update of the matchmaking threshold may be carried out after a plurality of matches have been observed. For example, a plurality of matches are observed and the average observed waiting time and average target waiting time calculated. These average values are then used in the update process.

Figure 5:
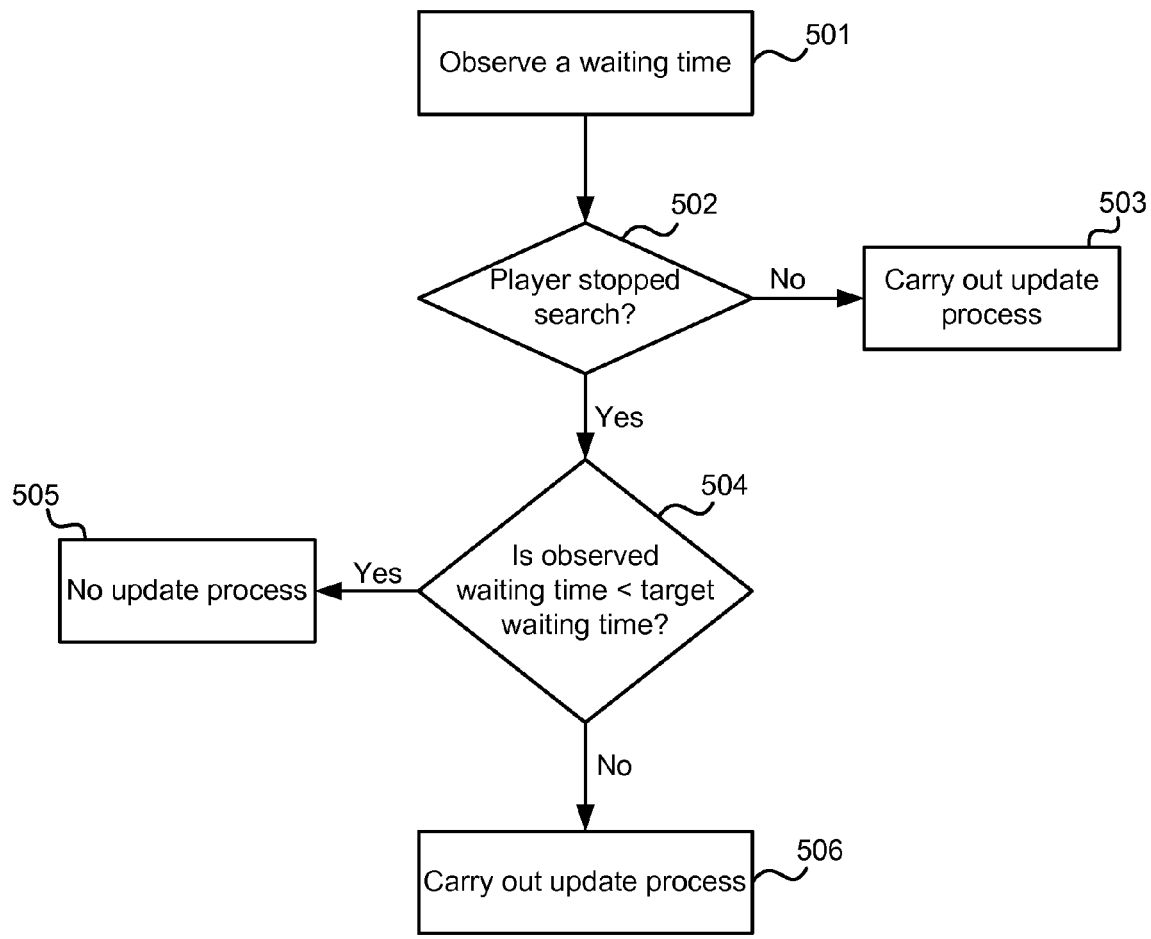
FIG. 5 is a flow diagram of another example method at the adaptive matchmaker.

In an example, the update process takes into account whether the observed waiting time was due to a player finding a match or due to that player discontinuing the search for a match. For example, if a player discontinues a search for a match after say 5 seconds, the actual time taken to find a match may be much longer than this (if the player had continued the search for a match). In this situation, if the 5 sec observed waiting time is used in the update process, the matchmaking threshold is inappropriately adjusted. This type of situation may be taken into account as described with reference to FIG. 5.

A waiting time is observed (block 501) and an assessment is made as to whether this was due to the player stopping the search for a match (block 502). For example, if a player discontinues searching for a match, information about this may be provided by the online game service 104. If the player did not stop the search for a match the update process proceeds (block 503) as described herein using the observed waiting time. If the player did discontinue the search for a match then an assessment is made as to whether the observed waiting time is less than the target waiting time (block 504). If the observed waiting time is less than the target waiting time then no update is carried out for this instance of the observed waiting time (block 505). Otherwise, the update process may proceed as described herein (block 506).

Identifying a Potential Match

Figure 3:
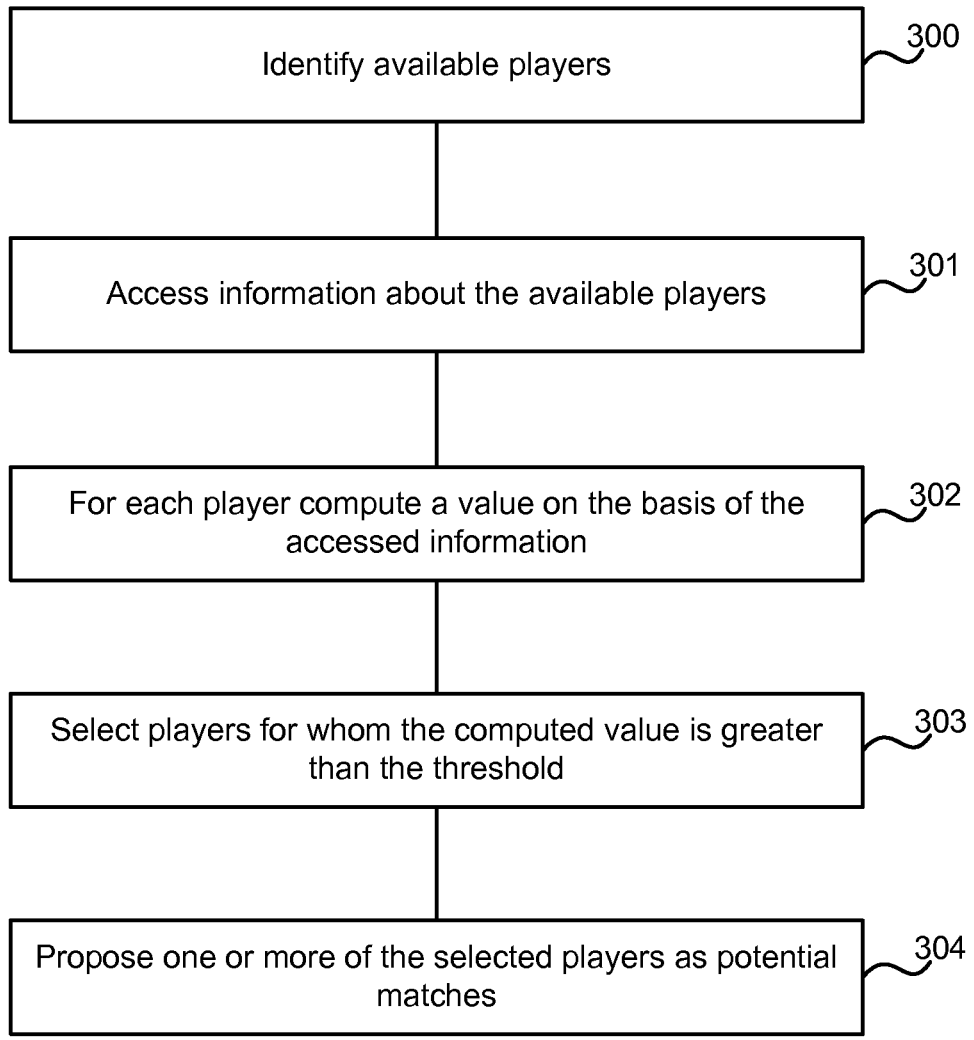
FIG. 3 is a flow diagram of an example method at the adaptive matchmaker of identifying a potential match.

FIG. 3 is a flow diagram of an example method at the adaptive matchmaker of identifying a potential match for a player A. Available players are identified (block 300). For example, the online game service 104 may have information about all available players who are currently actively connected to the online game service 104 and who are seeking matches. Information about these available players is then accessed (block 301). For example, this may be information about the skill level of those players, their geographical location, the quality of their connection to the online service, information about the game functionality available to those players, information about any particular game or game mode required by those players etc. This information may be received directly from the player terminals 103 or may be accessed from the database 102 or other source.

For each player a value is then computed on the basis of the accessed information (block 302). For example, this value may be a number indicating the skill level of a player. Alternatively, it may be a number produced by combining a value indicating skill level with a value indicating quality of connection. The value may be computed in any suitable manner using any combination of information about the player provided that the value is computed in the same way for each player.

A selection is then made of those available players for whom the computed value is greater than the matchmaking threshold (block 303). Alternatively those players with values less than the matchmaking threshold are selected. One or more of the selected players are then proposed as potential matches (block 304).

In the examples described above a single matchmaking threshold and target waiting time pair is used for all categories of matches such as matches for different games, game modes, skill categories, geographical locations etc. In order to further improve the trade off between quality of proposed matches and waiting time, information about these categories of matches may be taken into account. For example, this is achieved by using separate matchmaking thresholds and target waiting time pairs for each game category.

Figure 4:
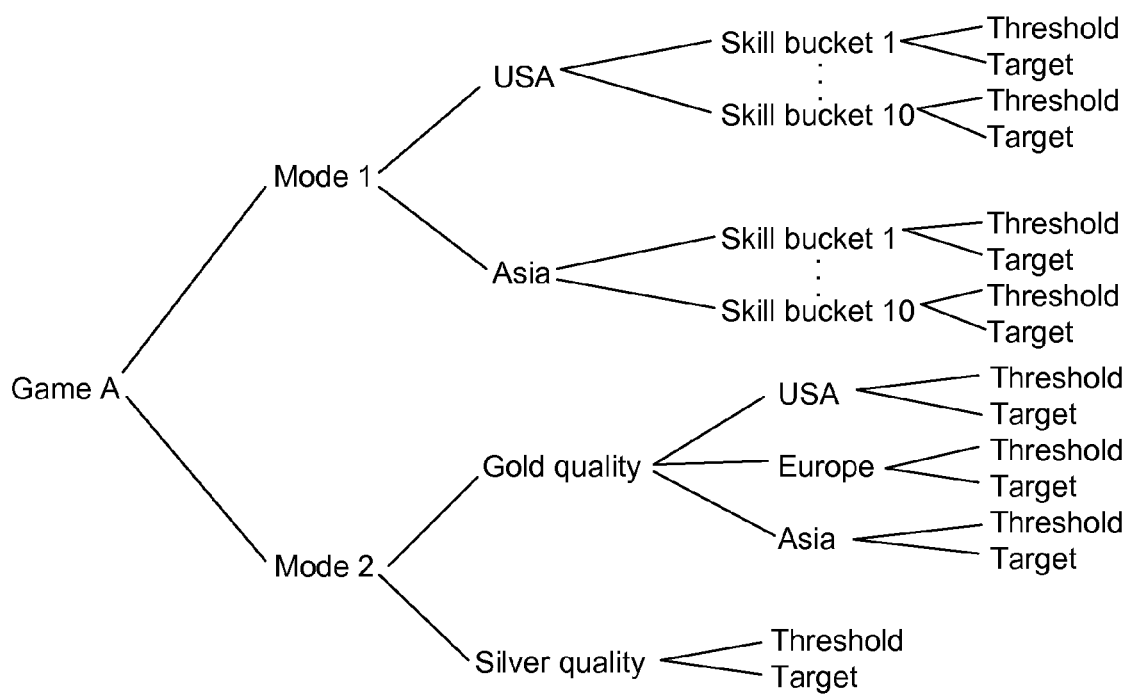
FIG. 4 illustrates example game categories.
Figure 4:
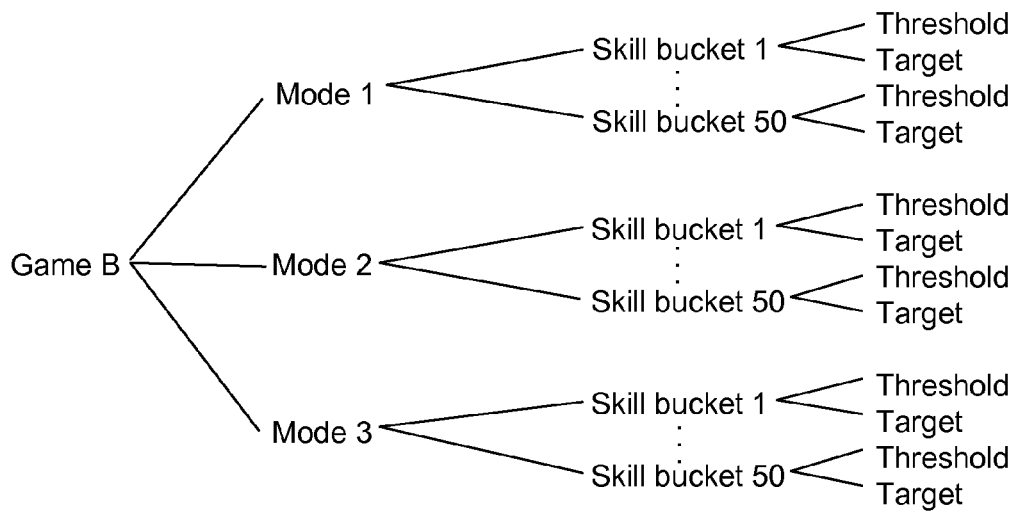

FIG. 4 illustrates some example game categories and associated matchmaking thresholds and target waiting times. For example, one game category is shown as:

game A, mode 1, USA, skill bucket 10 and another as game B, mode 2, skill bucket 50.

Game categories may also be based on time of day, for example, with 24 categories for a given game, one for each hour of the day.

As illustrated in FIG. 4, for each game category a matchmaking threshold and a target waiting time is stored. The game category information and associated matchmaking threshold and target waiting time values may be stored at database 102 in any suitable manner. Initially, the matchmaking threshold and target waiting time values are set to default values. As potential matches are proposed and waiting times are observed the update process of FIG. 2 occurs and the matchmaking threshold values dynamically change over time.

Another Exemplary Method

In another example, the game categories used are game title (GT), game mode (GM) and skill bucket (SB). For each game title, game mode and skill bucket a matchmaking threshold MT is set to some initial value $MT_0(GT, GM, SB)$ and the target waiting time TWT(GT, GM, SB) is specified.

For each player P searching for a match in a given game title and game mode, the current matchmaking threshold MT(GT, GM, SB) is used for the selection of the proposed match. After joining a match it is recorded which game title, game mode and skill bucket the player falls into together with an observed waiting time OWT(P, GT, GM, SB) that was required for the matchmaking.

In an example, the matchmaking threshold MT(GT, GM, SB) is updated such that it is increased (tightened) when the observed waiting time OWT(P, GT, GM, SB) is less than the target waiting time TWT(GT, GM, SB) and decreased (relaxed) when the observed waiting time is more than the target waiting time.

For example, the adaptive matchmaker 101 may use a linear update rule as follows:

$$MT_{new}(GT, GM, SB) = MT_{old}(GT, GM, SB) + \alpha*[TWT(GT, GM, SB) - OWT(P, GT, GM, SB)]$$

where $\alpha$ is a positive pre-specified constant that acts as a factor in front of the subsequent term.

As mentioned above the update of the matchmaking threshold may be carried out after a plurality of matches have been observed. For example, a plurality of matches are observed for a given game category and the average observed waiting time calculated. This average value is then used in the update process. Alternatively, the update is only carried out after every nth match that occurs whilst ignoring information about observed waiting time for intermediate matches.

In another example, the update mechanism comprises a damping process. For example, a range is specified within which no change is made to the matchmaking threshold. This helps to ensure that the matchmaking threshold is not repeatedly changed when the observed waiting time varies by small amounts around the target waiting time. For example the constant $\epsilon$ is incorporated into an update rule as follows:

IF OWT (P, GT, GM, SB) differs from TWT (GT, GM, SB) by more than $\epsilon$ THEN:

$$MT_{new}(GT, GM, SB) = MT_{old}(GT, GM, SB) + \alpha*[TWT(GT, GM, SB) - OWT(P, GT, GM, SB)]$$

Exemplary Computing-Based Device

Figure 6:
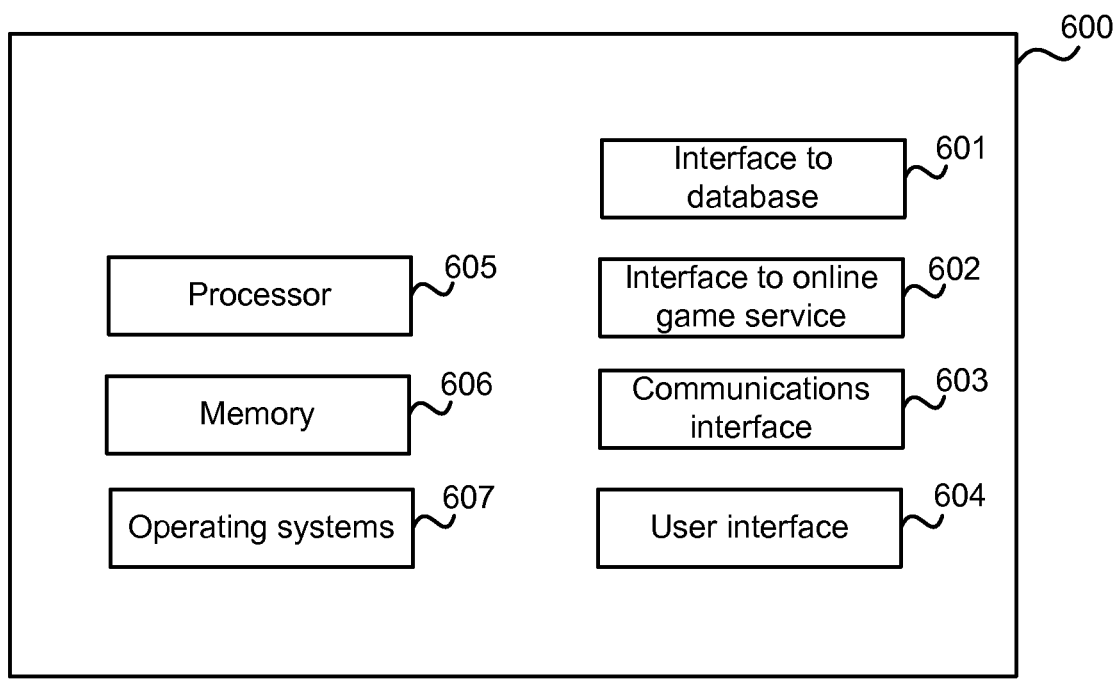
FIG. 6 illustrates an exemplary computing-based device in which embodiments of an adaptive matchmaker may be implemented.

FIG. 6 illustrates various components of an exemplary computing-based device 600 which may be implemented as any form of a computing and/or electronic device, and in which embodiments of an adaptive matchmaker may be implemented.

The computing-based device 600 comprises an interface 601 to a database holding information about matchmaking thresholds and target waiting times for different game categories. The database may optionally hold information about players and player terminals. The device 600 also optionally comprises communication interface 603 which enables it to communicate with a communications network for example, where an online game service is provided. An interface 602 to an online game service is also provided.

Computing-based device 600 also comprises one or more processors 605 which may be microprocessors, controllers or any other suitable type of processors for processing executable instructions to control the operation of the device in order to provide an adaptive matchmaker. Platform software comprising an operating system 607 or any other suitable platform software may be provided at the computing-based device to enable application software and/or the executable instructions to be executed on the device.

The computer executable instructions may be provided using any computer-readable media, such as memory 606. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

The device 600 may comprise a graphical user interface 604, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate. Additionally, individual blocks may be deleted from any of the methods without departing from the spirit and scope of the subject matter described herein.

It will be understood that the above description of a preferred embodiment is given by way of example only and that various modifications may be made by those skilled in the art.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of adaptive matchmaking for games, the method comprising:
   receiving information about a first player who is seeking a match with at least one other player in order to play a game;
   computing, on a processor, a first numerical value based at least in part on a skill level of the first player and a connection quality of the first player to the game;
   computing, on the processor, a second numerical value based at least in part on a skill level of the at least one other player and a connection quality of the at least one other player to the game;
   accessing a matchmaking threshold and a target waiting time stored in memory, the matchmaking threshold being a numerical value;
   finding a potential match for the first player based on the matchmaking threshold, the finding comprising selecting the at least one other player as a potential match for the first player if both of the first value and the second value are either greater or lesser than the matchmaking threshold, and not selecting the at least one other player as a potential match for the first player if one of the first value and the second value is greater than the matchmaking threshold and the other of the first value and the second value is lesser than the matchmaking threshold;
   observing a waiting time for the first player, the waiting time being a time taken from receiving the information about the first player to accepting, by the first player, a proposed match or to discontinuing, by the first player, searching for the match;
   updating the matchmaking threshold on the basis of at least a relationship between information about the observed waiting time and information about the target waiting time; and
   storing the updated matchmaking threshold in the memory.

2. A method as claimed in claim 1 wherein accepting the proposed match includes the first player entering the game.

3. A method as claimed in claim 2 which further comprises, if the observed waiting time relates to a time taken for the first player to discontinue, only updating the matchmaking threshold if the observed waiting time is less than the target waiting time.

4. A method as claimed in claim 1 wherein the step of updating the matchmaking threshold is carried out using a linear process.

5. A method as claimed in claim 1 which further comprises receiving information about a specified game category within which the player is seeking a match.

6. A method as claimed in claim 5 wherein the process of accessing the matchmaking threshold and target waiting time comprises accessing a matchmaking threshold and a target waiting time which are specific to the specified game category.

7. A method as claimed in claim 5 wherein the specified game category relates to a skill bucket.

8. A method as claimed in claim 5 wherein the specified game category relates to a game title.

9. A method as claimed in claim 5 wherein the specified game category relates to a time of day.

10. A method as claimed in claim 1 which further comprises repeating the method of claim 1 and updating the matchmaking threshold only after a plurality of waiting times have been observed.

11. A method as claimed in claim 10 which comprises calculating an average of the plurality of observed waiting times and using that average during the process of updating the matchmaking threshold.

12. A computer-implemented method of adaptive matchmaking for games, the method comprising:
   receiving information about a first player who is seeking a match with at least one other player in order to play a game of a specified game category;
   accessing a matchmaking threshold and a target waiting time stored in memory and both specific to the specified game category, the matchmaking threshold being a numerical value;
   finding, by a processor, a potential match for the first player based on the matchmaking threshold;
   observing a waiting time for the first player, the waiting time being a time taken from receiving the information about the first player to accepting, by the first player, a proposed match or to discontinuing, but the first player, searching for the match;
   updating the matchmaking threshold, by the processor, on the basis of at least a relationship between information about the waiting time and information about the target waiting time, the updating comprising using a damping process wherein a change is made to the matchmaking threshold if the waiting time varies from the target waiting time by more than a predetermined value and a change is not made to the matchmaking threshold if the observed waiting time does not vary from the target waiting time by more than the predetermined value; and
   storing the updated matchmaking threshold in the memory.

13. A method as claimed in claim 12 wherein the step of updating the matchmaking threshold is carried out using a linear process.

14. A method as claimed in claim 12 which further comprises repeating that method and updating the matchmaking threshold only after a plurality of waiting times have been observed for the specified game category.

15. An adaptive matchmaking system comprising:
   a memory;
   an input arranged to receive information about a first player who is seeking a match with at least one other player in order to play a game;
   a database interface arranged to access a matchmaking threshold and a target waiting time from a database stored in the memory, the matchmaking threshold being a numerical value; and
   a processor coupled to the memory and the database, the processor arranged to use the matchmaking threshold to find a potential match for the first player and to observe a waiting time for the first player, the waiting time being a time taken from the information about the first player being received to accepting, by the first player, a proposed match or to discontinuing, by the first player, searching for the match;
   wherein the processor is also arranged to update the matchmaking threshold on the basis of at least a relationship between information about the waiting time and information about the target waiting time, the updating comprising using a damping process wherein a change is made to the matchmaking threshold if the waiting time varies from the target waiting time by more than a predetermined value and a change is not made to the matchmaking threshold if the waiting time does not vary from the target waiting time by more than the predetermined value.

16. A adaptive matchmaking system as claimed in claim 15 wherein the database interface is also arranged to store the updated matchmaking threshold in the database.

17. A adaptive matchmaking system as claimed in claim 15 which comprises the database and wherein the database also comprises information about players.

18. A adaptive matchmaking system as claimed in claim 15 wherein the database comprises a matchmaking threshold and a target waiting time for each of a plurality of different game categories.

\* \* \* \* \*